US010728907B2

(12) United States Patent
Gibson et al.

(10) Patent No.: US 10,728,907 B2
(45) Date of Patent: Jul. 28, 2020

(54) FEEDBACK ASSISTED DOWNLINK CONTROL CHANNEL CONFIGURATION (71) Applicant: Telefonaktiebolaget LM Ericsson (publ), Stockholm (SE)

(72) Inventors: Scott Gibson, Ottawa (CA); Parsa Larijani, Ottawa (CA); Roger Mah, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 51 days.

(21) Appl. No.: 15/767,854

(22) PCT Filed: Nov. 9, 2015

(86) PCT No.: PCT/IB2015/058652
§ 371 (c)(1),
(2) Date: Apr. 12, 2018

(87) PCT Pub. No.: WO2017/081509
PCT Pub. Date: May 18, 2017

(65) Prior Publication Data
US 2018/0310320 A1    Oct. 25, 2018

(51) Int. Cl.
*H04J 3/16* (2006.01)
*H04W 72/08* (2009.01)
(Continued)

(52) U.S. Cl.
CPC ......... *H04W 72/085* (2013.01); *H04L 5/0053* (2013.01); *H04L 5/0094* (2013.01);
(Continued)

(58) Field of Classification Search
CPC ........... H04W 72/085; H04W 28/0231; H04W 24/10; H04W 24/08; H04W 28/00; H04W 28/0268; H04L 5/0053; H04L 1/0026
See application file for complete search history.

(56) References Cited

U.S. PATENT DOCUMENTS 8,194,765 B2 *  6/2012  Harris ................. H04L 1/003
                                                    375/260
8,355,360 B2 *  1/2013  Yang .................. H04W 52/143
                                                    370/318
(Continued)

FOREIGN PATENT DOCUMENTS

CN          102547997 A        7/2012

OTHER PUBLICATIONS

International Search Report and Written Opinion of the International Searching Authority dated Jul. 20, 2016 issued in corresponding PCT Application Serial No. PCT/IB2015/058652, consisting of 10 pages.

*Primary Examiner* — Hanh N Nguyen
(74) *Attorney, Agent, or Firm* — Christopher & Weisberg, P.A.

(57) ABSTRACT

A method and network node for determining radio resources for allocation to a downlink control channel in a communication network are disclosed. According to one aspect, a method includes receiving, over a predetermined measurement period, a plurality of reports from a wireless device, each report being indicative of a channel quality within at least a subband of an available bandwidth of the communication network. The method further includes for each subband for which at least one report has been received, determining a variance of the channel quality and an average of the channel quality over the predetermined measurement period. The method further includes determining subbands having at least a variance of the channel quality less than a first threshold.

8 Claims, 10 Drawing Sheets (51) Int. Cl.
*H04L 5/00* (2006.01)
*H04W 72/12* (2009.01)
*H04W 24/08* (2009.01)
*H04W 24/10* (2009.01)
*H04W 28/02* (2009.01)

(52) U.S. Cl.
CPC ........... *H04L 5/0096* (2013.01); *H04W 24/08* (2013.01); *H04W 24/10* (2013.01); *H04W 28/0231* (2013.01); *H04W 72/1278* (2013.01)

(56) References Cited

U.S. PATENT DOCUMENTS

| | | | |
|---|---|---|---|
| 8,493,874 B2 * | 7/2013 | Chen | H04L 1/0027 370/252 |
| 9,692,554 B2 * | 6/2017 | Soman | H04B 3/54 |
| 9,871,642 B2 * | 1/2018 | Bontu | H04L 1/0019 |
| 10,142,851 B2 * | 11/2018 | Tao | H04W 16/14 |
| 2013/0107816 A1 | 5/2013 | Iraji et al. | |
| 2013/0107861 A1 | 5/2013 | Cheng et al. | |
| 2014/0169200 A1 | 6/2014 | Woo | |
| 2014/0286288 A1 | 9/2014 | Park et al. | |
| 2014/0328302 A1 | 11/2014 | Park et al. | |
| 2015/0078284 A1 | 3/2015 | Lee et al. | |
| 2015/0117240 A1 | 4/2015 | Liang et al. | |
| 2015/0237632 A1 | 8/2015 | Soldati | |

* cited by examiner (Prior Art)
FIG. 1

FEEDBACK ASSISTED DOWNLINK CONTROL CHANNEL CONFIGURATION

CROSS-REFERENCE TO RELATED APPLICATIONS

This application is a Submission Under 35 U.S.C. § 371 for U.S. National Stage Patent Application of International Application Number: PCT/IB2015/058652, filed Nov. 9, 2015 entitled "FEEDBACK ASSISTED DOWNLINK CONTROL CHANNEL CONFIGURATION" which is incorporated herein by reference.

TECHNICAL FIELD

Wireless communications and, in particular, determining radio resources for allocation to a downlink control channel in a wireless communications network.

BACKGROUND

In Release 10 and prior releases of Long Term Evolution (LTE) wireless communication system standards, the physical downlink control channels (PDCCH) carry all of the downlink (DL) and uplink (UL) scheduling information to inform individual wireless devices where to find information in the time and frequency resources utilized for transmissions between the wireless devices and a base station, such as an eNodeB (eNB). As used herein, DL refers to communications from the base station to the wireless device and UL refers to communications from the wireless device to the base station.

Figure 1:
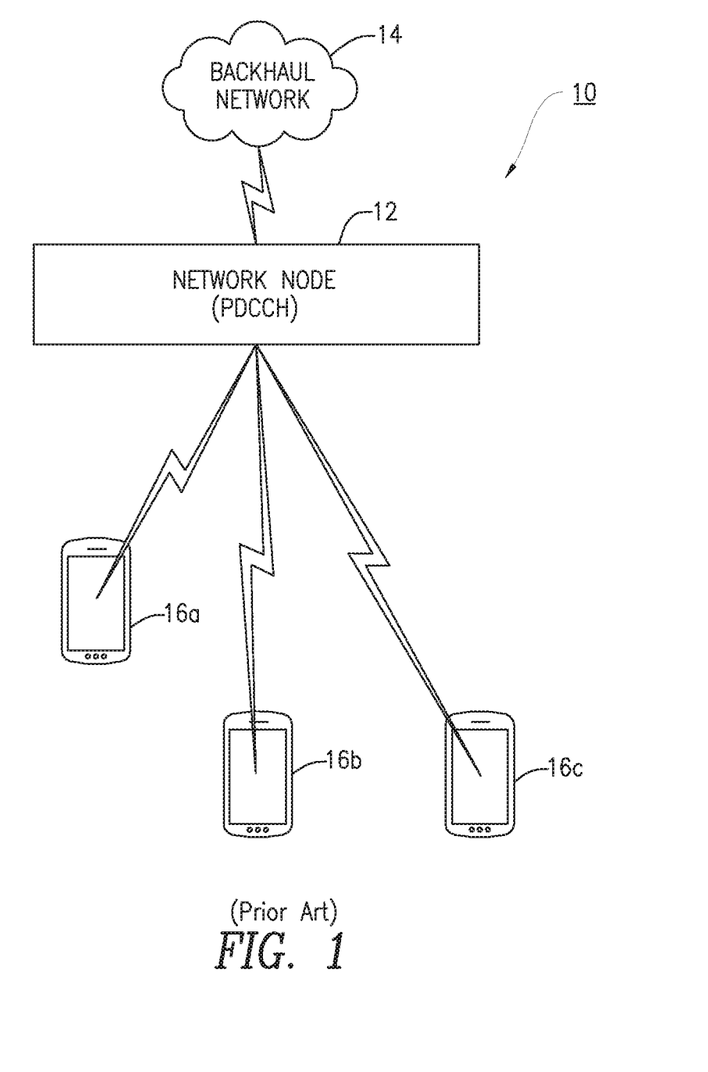
FIG. 1 is a block diagram of a known wireless communication network.

Such a typical wireless communication system 10 is shown schematically in FIG. 1. A network node 12, which can be a base station, is in communication with a backhaul network 14. The backhaul network 14 may include the Internet and/or the public switched telephone network (PSTN). The network node 12 communicates with a plurality of wireless devices 16a, 16b and 16c, referred to collectively herein as wireless devices 16. Although only one network node 12 is shown, an actual wireless communication system 10 has many network nodes, e.g., many base stations. Also, there will typically be more than three wireless devices 16.

Figure 2:
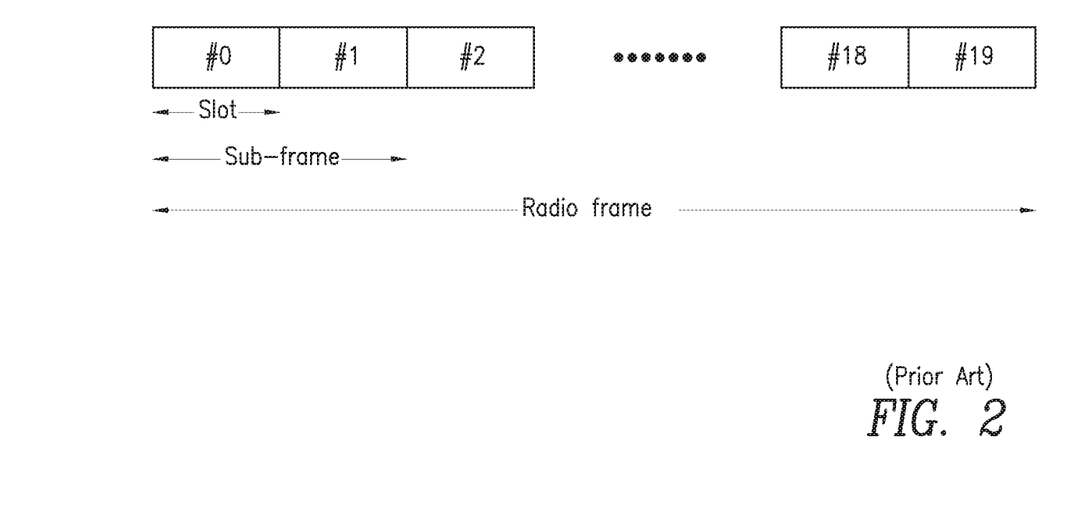
FIG. 2 is an illustration of a radio frame showing a slot and subframe arrangement.
Figure 3:
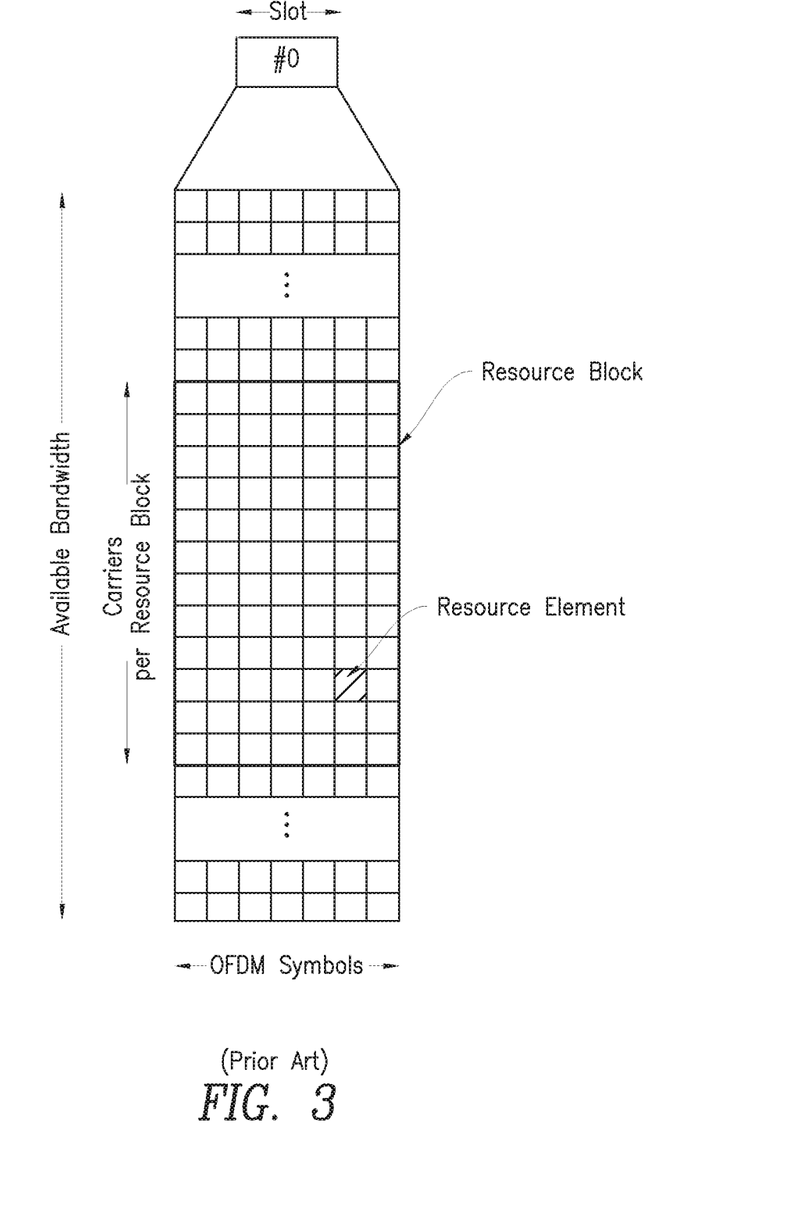
FIG. 3 is an illustration of a slot of a radio frame that includes multiple resource elements.

In communication systems based on LTE standards, downlink communications between the network node 12 and the wireless devices 16 are based on a basic radio frame an example of which is illustrated in FIG. 2. A basic radio frame generally includes twenty slots which are paired together to form subframes, i.e., two slots for a subframe. In the more general sense, slots are combined to form subframes and subframes are combined to form frames. With additional reference to FIG. 3, each slot of the basic radio frame generally includes multiple resource elements (REs) which can be illustrated as a resource grid including multiple frequency carriers and multiple orthogonal frequency division multiplexing (OFDM) symbols. In the resource grid, one RE denotes a single OFDM symbol transmitted over a single frequency carrier. As illustrated in FIG. 3, OFDM symbols and frequency carriers can be grouped as physical resource blocks (PRBs). An LTE PRB generally includes 7 OFDM symbols over 12 frequency carriers for a total of 84 REs per PRB. However, these quantities can vary.

Figure 4:
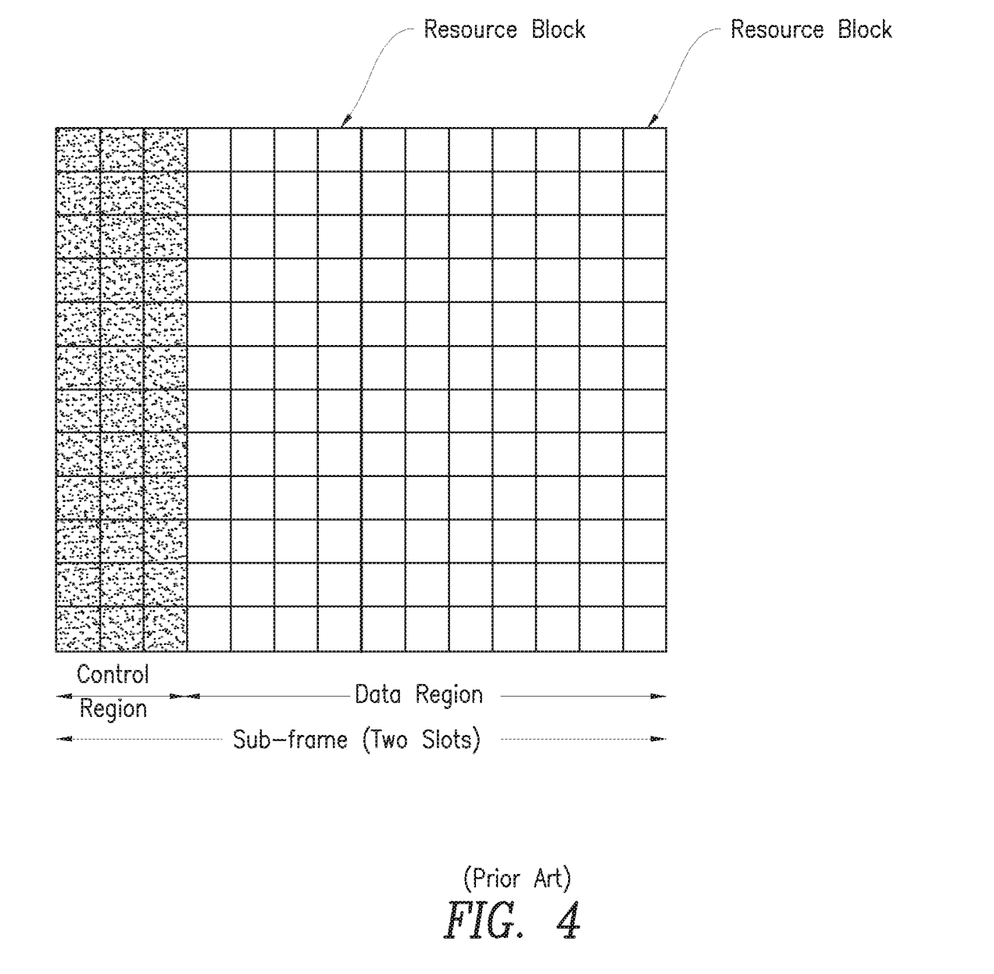
FIG. 4 is an illustration of an exemplary subframe having a control region and a data region.

When two slots are combined into a subframe, as shown in FIG. 2, their combined resource elements are further divided into a control region which generally occupies the first 3 OFDM symbols (the first 4 OFDM symbols when the available bandwidth is 1.4 MHz) over the available bandwidth, i.e. over all the available frequency carriers, and a data region which occupy the remaining OFDM symbols, also over the available bandwidth. In FIG. 4, which illustrates an exemplary subframe, the shaded region is the control region while the non-shaded region is the data region.

The network node 12 generates and transmits a PDCCH which informs each wireless device 16 whether and when data is to be transmitted to the wireless device 16 or received from the wireless device 16. According to the aforementioned communication standards, a wireless device 16 must decode the PDCCH successfully in order to receive and send data. The PDCCHs are located within the control region of a subframe which, as indicated above, usually occupies the first 3 OFDM symbols at the beginning of each transmitted subframe.

The capacity of the PDCCH is a limiting factor in systems where there are a large number of wireless devices using low rate services such as voice over Internet protocol (VoIP). Indeed, due to the limited size of the control region, the number of PDCCHs than can be transmitted in any given subframe is limited. To alleviate the limitations of the control region, Release 11 of the LTE communication standards introduced an enhanced PDCCH (ePDCCH) which is transmitted on radio resources located within the data region of a subframe in which data are transmitted over physical downlink shared channels (PDSCH). Contrary to PDCCHs which are transmitted on radio resources distributed over the whole system bandwidth, ePDCCHs are transmitted on radio resources located on specific frequencies, or carriers, that can be allocated dynamically. In that regard, ePDCCHs employ frequency division multiplexing (FDM).

According to LTE communication standards, the available bandwidth of a communication system can be partitioned into subbands, where each subband comprises a number of PRBs which depends on the available bandwidth. Table 1 below sets forth the number of PRBs per subband as a function of the number of PRBs supported by the system bandwidth

TABLE 1

| System Bandwidth BW | Subband Size (k) |
|---|---|
| 6-7 | NA |
| 8-10 | 4 |
| 11-26 | 4 |
| 27-63 | 6 |
| 64-110 | 8 |

Hence, according to Table 1, for a communication system with a system bandwidth supporting 16 PRBs, each subband will comprise 4 PRBs for a total of 4 subbands.

A wireless device can be provisioned with one or two sets of ePDCCH PRBs for ePDCCH monitoring. The ePDCCH PRB sets can consists of two, four or eight PRBs and the two sets maybe of different sizes. The location of these sets of PRBs and the configuration of these sets among the subbands can be provisioned as best suits the wireless device 16 and the network node 12, e.g., the eNodeB. In that sense, subband feedback is provided by the wireless device 16 to the network node 12 to indicate which sections of the frequency spectrum are preferred by the wireless device 16. Subband feedback reports are sent often as the channel qualities experienced by the wireless device 16 can change quickly. However, as a network node 12 may service several wireless devices 16 at any given time, trying to act on every subband feedback reports sent by every wireless device 16 would add a significant processing burden on the network node 12.

SUMMARY

Some embodiments provide a method and system for determining radio resources for allocation to a downlink control channel in a communication network. According to one aspect, a method includes receiving, over a predetermined measurement period, a plurality of reports from a wireless device, each report being indicative of a channel quality within at least a subband of an available bandwidth of the communication network. The method further includes for each subband for which at least one channel quality report has been received, determining a variance of the channel quality and an average of the channel quality over the predetermined measurement period. The method further includes determining subbands having at least a variance of the channel quality lower than a first threshold.

According to this aspect, in some embodiments, the method further includes determining, from the subbands having at least a variance of the channel quality lower than the first threshold, subbands having an average of the channel quality greater than a second threshold. In some embodiments, the method further includes determining, from the subbands having at least a variance of the channel quality lower than the first threshold, a predetermined number of subbands having the highest average of the channel quality. In some embodiments, the method further includes reconfiguring an allocation of radio resources to the determined subbands if the determined subbands are different from current subbands used for transmitting the downlink control channels to the wireless device. In some embodiments, the method further includes reconfiguring an allocation of radio resources to the determined subbands if the reconfiguration would result in a more efficient allocation of radio resources. In some embodiments, a more efficient allocation of radio resources is indicated when a variance of the channel quality of the currently used subbands is greater than the variance of the channel quality of the determined subbands. In some embodiments, a more efficient allocation of radio resources is indicated when an average of the channel quality of the currently used subbands is less that the average of the channel quality of the determined subbands. In some embodiments, the channel quality within a subband is at least based on a measure of a deviation of a channel quality indicator of the subband from a wideband channel quality indicator. In some embodiments, the predetermined measurement period is a radio resource control reconfiguration sequence period. In some embodiments, the predetermined measurement period is longer than a radio resource control reconfiguration sequence period.

According to another aspect, a node in a wireless communication network is configured to determine radio resources for allocation to a downlink control channel in the wireless communication network. The node comprises processing circuitry. The processing circuitry may include a memory and a processor. The processing circuitry is configured to receive, over a predetermined measurement period, a plurality of reports from a wireless device, each report being indicative of a channel quality within at least a subband of an available bandwidth of the communication network. The processing circuitry is also configured to determine, for each subband for which at least one channel quality report has been received, a variance of the channel quality and an average of the channel quality over the predetermined measurement period. The processing circuitry is also configured to determine subbands having at least a variance of the channel quality lower than a first threshold.

According to this aspect, in some embodiments, the processing circuitry is further configured to determine, from the subbands having at least a variance of the channel quality lower than the first threshold, subbands having an average of the channel quality greater than a second threshold. In some embodiments, the processing circuitry is further configured to determine, from the subbands having at least a variance of the channel quality lower than the first threshold, a predetermined number of subbands having the highest average of the channel quality. In some embodiments, the processing circuitry is further configured to reconfigure an allocation of radio resources to the determined subbands if the determined subbands are different from current subbands used for transmitting the downlink control channels to the wireless device. In some embodiments, the processing circuitry is further configured to reconfigure an allocation of radio resources to the determined subbands if the reconfiguration would result in a more efficient allocation of radio resources. In some embodiments, a more efficient allocation of radio resources is indicated when a variance of the channel quality of the currently used subbands is greater than the variance of the channel quality of the determined subbands. In some embodiments, a more efficient allocation of radio resources is indicated when an average of the channel quality of the currently used subbands is less than the average of the channel quality of the determined subbands. In some embodiments, the channel quality within a subband is at least based on a measure of a deviation of a channel quality indicator of the subband from a wideband channel quality indicator. In some embodiments, the predetermined measurement period is a radio resource control reconfiguration sequence period. In some embodiments, the predetermined measurement period is longer than a radio resource control reconfiguration sequence period.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to a method and system for determining radio resources for allocation to a downlink control channel in a wireless communications network.

Accordingly, the system and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Note that references to PDCCHs, ePDCCHs and eNBs are exemplary. Embodiments are not limited to LTE and may refer to control channels and base stations of other wireless access technologies. Henceforth, the term downlink control channel may include but not be limited to an ePDCCH and the term base station may include but not be limited to an eNB. Again, these terms are not used solely in the sense of LTE communications and may apply to other communication technologies that make use of various control channel (s). Similarly, the term network node is not limited to a base station (or eNB) and can be any node in the wireless communication network that is configured to perform the functions of the network node described herein.

In some embodiments, methods are provided to identify subbands of the available bandwidth of a communication system having a high channel quality according to one or more criteria in order to allocate radio resources among such subbands for transmission of the downlink control channels. By allocating radio resources for transmission of the downlink control channels among subbands having high channel quality, lower numbers of resource elements may be employed for the transmission of the downlink control channels, which may further result in increased control channel capacity, increased control channel robustness, lower processing overhead of the base station, and increased control channel performance for wireless devices experiencing slowly changing channels.

Figure 5:
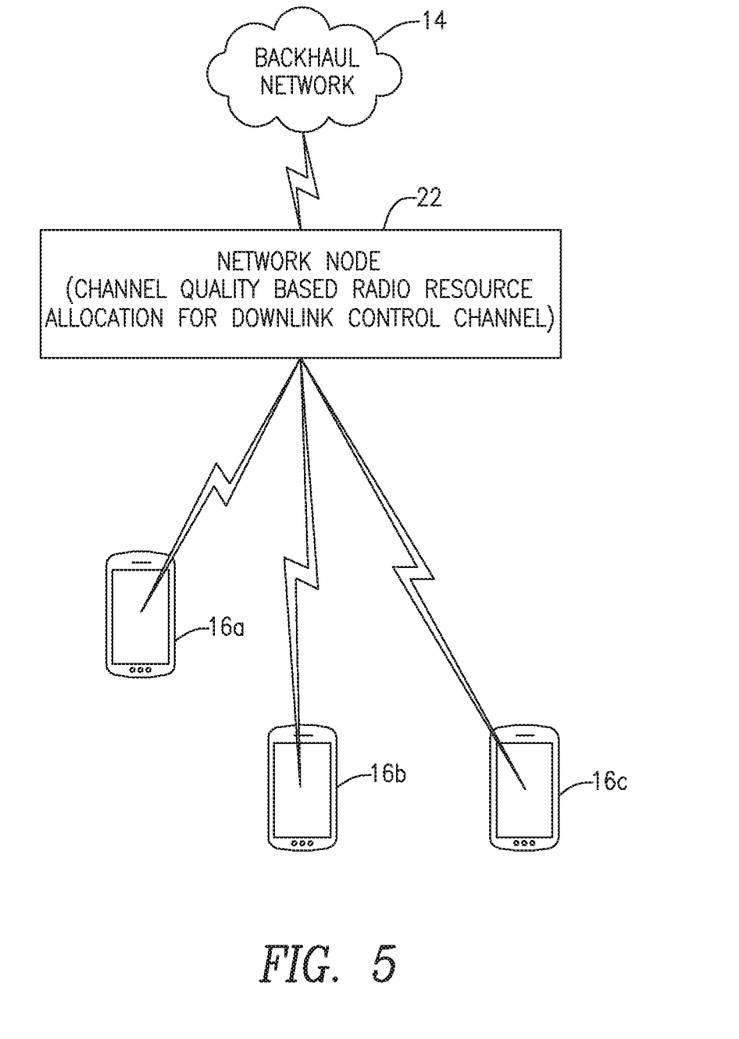
FIG. 5 is a block diagram of a wireless communication network that includes a network node performing a channel quality based selection of subbands for downlink control channel transmission.

Accordingly, in some embodiments, a method of determining radio resources for allocation to a downlink control channel in a communication network is provided. Referring to the drawing figures in which like reference designators refer to like elements, there is shown in FIG. 5 a block diagram of a wireless communication network with a network node 22 configured to perform channel quality based radio resource allocation for downlink control channels according to the methods described herein. The network node 22 receives a plurality of channel quality measurement reports from a wireless device 16 over a predetermined measurement period. Each channel quality measurement report indicates a channel quality within a subband. In some embodiments, the channel quality may be reported as a channel quality indicator, CQI, or as a differential CQI. Once the measurement period concludes, then, for each subband, a variance of the channel quality over the measurement period and an average of the channel quality over the measurement period are determined by the network node 22 from the channel quality measurement reports. Subbands having at least a variance of the channel quality lower than a first threshold are first determined. Then, from these subbands having at least a variance of the channel quality lower than the first threshold, one or more subbands are further determined for use in transmitting the downlink control channels. In particular, radio resources for transmitting the downlink control channels may be allocated to the determined subbands. In some embodiments, these further determined subbands are those having an average of the channel quality greater than a second threshold. In some embodiments, these further determined subbands are a predetermined number of subbands exhibiting the highest average of the channel quality.

Data is therefore recorded for the duration of the measurement period, and at the end of the measurement period, a statistical analysis of the channel quality reported for each subband is performed to evaluate the subband for viability for the downlink control channels. In some embodiments, statistics used in the statistical analysis are the variance of the channel quality of the subband over the measurement period and the average or mean value of the channel quality of the subband over the measurement period. Good candidate subbands for use in transmitting the downlink control channels to the wireless device are generally the subbands having a combination of low variance of channel quality yet a high average of channel quality over the measurement period. In some embodiments, candidate subbands are the ones having a variance of the channel quality lower than a first threshold and an average value of the channel quality exceeding a second threshold. In some embodiments, the variance is the primary determiner when selecting, or pre-selecting, a subband for downlink control channel transmission.

Figure 6:
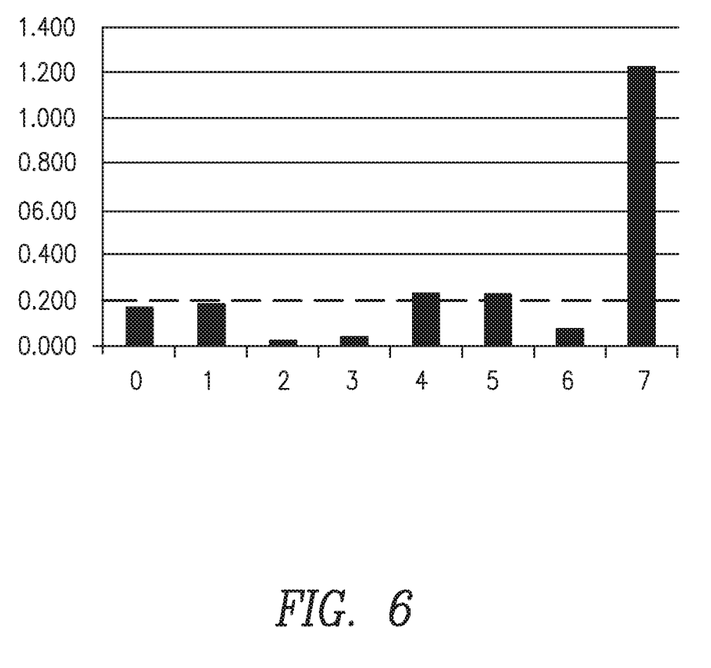
FIG. 6 is a bar chart of channel quality variance for a plurality of subbands.
Figure 7:
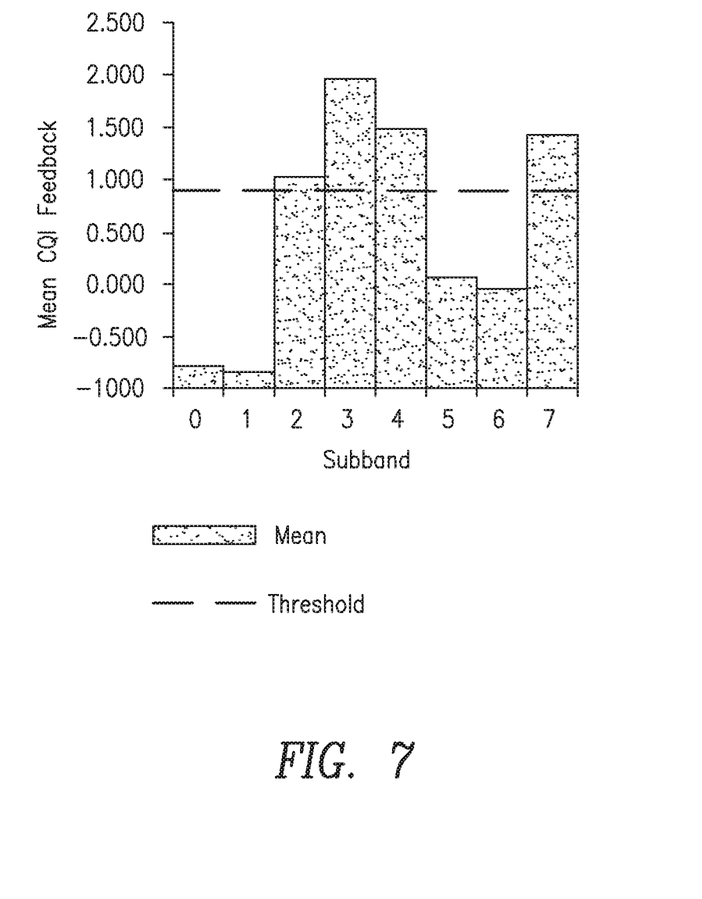
FIG. 7 is a bar chart of average channel quality for a plurality of subbands.

Examples of the statistical analysis are shown in FIG. 6 and FIG. 7 for determining which subbands may qualify as subbands to which radio resources may be allocated for downlink control channel transmission. FIG. 6 illustrates channel quality variance analysis and FIG. 7 illustrates average channel quality analysis.

FIG. 6 is a bar graph of variance over the measurement period of channel quality versus subbands for the eight subbands of this example. The subbands having a variance less than a first threshold of 0.2 shown as a dashed line in this example are subbands 0, 1, 2, 3 and 6.

FIG. 7 is a bar graph of average value of channel quality, measured as averages of CQI, over a measurement period versus subbands for the eight subbands. A second threshold value of 1.00 in this example is shown as a dashed line. The subbands having an average CQI above this threshold are subbands 2, 3, 4 and 7. Thus, the subbands having a variance less than the first threshold of 0.2 and having an average greater than the second threshold of 1.0 are subbands 2 and 3. In some embodiments, these subbands may be selected for allocation of radio resources for transmission of the downlink control channels. Note that in some implementations the number of subbands may be less than or greater than eight and the thresholds may be different than 0.2 and 1.0. Note that, in this example, although subband 7 has a high average CQI value during the measurement period, subband 7 is not selected because it has a variance well above the first threshold.

Note that in some embodiments, the channel quality (e.g. CQI) of a subband may be based at least in part on a deviation of a channel quality of the subband from a wideband channel quality, that is, a channel quality for the whole available bandwidth. Thus, in some embodiments, the channel quality for a given subband may be encoded differentially relative to the wideband channel quality. In some embodiments, this differential channel quality indicator may be defined as follows:

differential CQI=subband CQI−wideband CQI.

In some embodiments, the different CQI value may be mapped as shown in Table 2.

TABLE 2

| Differential CQI value | Offset level |
| --- | --- |
| 0 | ≤1 |
| 1 | 2 |
| 2 | 3 |
| 3 | ≥4 |

The differential channel quality may be used in the calculations of the channel quality variance and channel quality average for each subband. By using the relative channel qualities, e.g. the differential CQI values, of the subbands relative to the wideband channel quality, the candidate subbands can be identified even under conditions where the wideband channel quality is fluctuating.

Figure 8:
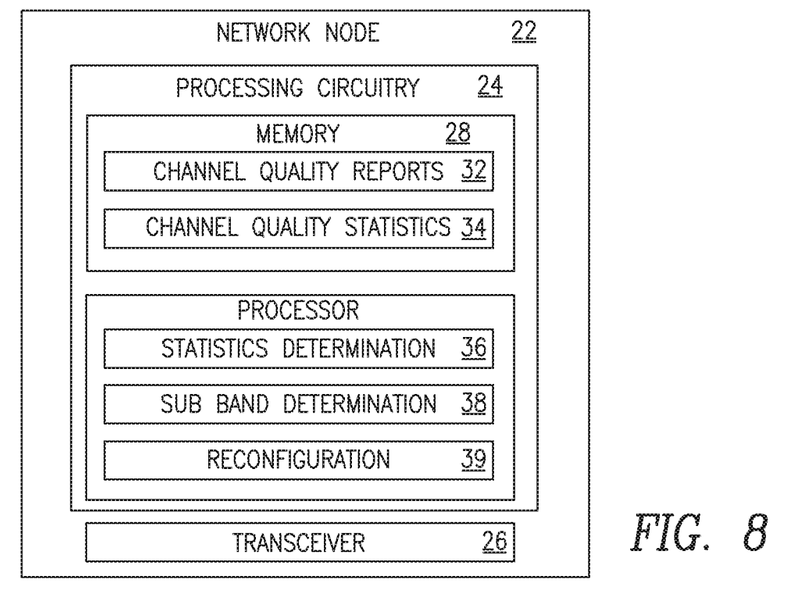
FIG. 8 is block diagram of a network node according to some embodiments.

FIG. 8 is a block diagram of a network node 22 configured to determine radio resources for allocation to a downlink control channel in a communication network. The base station 22 has processing circuitry 24 and a transceiver 26. In some embodiments, the processing circuitry 24 may include a memory 28 and a processor 30. The memory 28 contains instructions which, when executed by the processor 30, configure the processor 30 to perform the one or more of the functions described herein. Note that determination of the resources for allocation to a downlink control channel for a wireless device 16 based on subband channel quality as described herein may typically be performed in a base station such as an eNodeB which serves the wireless device 16 and actually transmits the downlink control channel. In some embodiments, the determination may be performed in another network node 22 of a wireless communication network such as a mobile management entity (MME) or serving gateway (SGW).

In some embodiments, the processing circuitry 24 may comprise integrated circuitry for processing and/or control, e.g., one or more processors and/or processor cores and/or FPGAs (Field Programmable Gate Array) and/or ASICs (Application Specific Integrated Circuitry). Processing circuitry 24 may comprise and/or be connected to and/or be adapted for accessing (e.g., writing to and/or reading from) memory 28, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 28 may be adapted to store code executable by control circuitry and/or other data, e.g., data pertaining to communication, e.g., configuration and/or address data of nodes, etc.

Processing circuitry 24 may be configured to perform any of the methods described herein and/or to cause such methods to be performed, e.g., by the base station 22. Corresponding instructions may be stored in the memory 28, which may be readable and/or readably connected to the processing circuitry 24. In other words, processing circuitry 24 may include a controller, which may comprise a microprocessor and/or microcontroller and/or FPGA (Field-Programmable Gate Array) device and/or ASIC (Application Specific Integrated Circuit) device. It may be considered that processing circuitry 24 includes or may be connected or connectable to memory, which may be adapted to be accessible for reading and/or writing by the controller and/or processing circuitry 24.

In some embodiments, the memory 28 is configured to store channel quality reports 32, each report being indicative of a channel quality within a subband of an available bandwidth of the communication network of which the base station 22 is a part. The memory 28 is also configured to store channel quality statistics 34 which may include a variance and an average of the channel quality over a predetermined measurement period for each subband. The processing circuitry 24 is configured to perform statistics determination 36 and subband determination 38. Statistics determination 36 may include determining the variance and the average of channel quality based on the stored channel quality reports.

Subband determination 38 may include determining subbands having at least a variance of the channel quality lower than a first threshold. Subband determination 38 may include, in some embodiments, determining, from the subbands having at least a variance of the channel quality lower than the first threshold, subbands having an average of the channel quality greater than a second threshold. Subband determination 38 may include, in some embodiments, determining, from the subbands having at least a variance of the channel quality lower than the first threshold, a predetermined number of subbands having the highest average of the channel quality.

Further, the processing circuitry 24 may be configured to perform radio resource allocation reconfiguration 39. Radio resource allocation reconfiguration 39 may include reconfiguring an allocation of radio resources to the determined subbands if the determined subbands are different from current subbands used for transmitting the downlink control channels.

The transceiver 26 transmits the determined subband identities to the wireless device whose channel quality was reported during the measurement period so that the wireless device knows on which subbands to listen for the downlink control channels. The transceiver 26 also receives the channel quality reports and transmits the downlink control channels. Although a transceiver 26 is described, it is understood that such a term is used for convenience and that implementations can use separate receiver and transmitter circuits.

Figure 9:
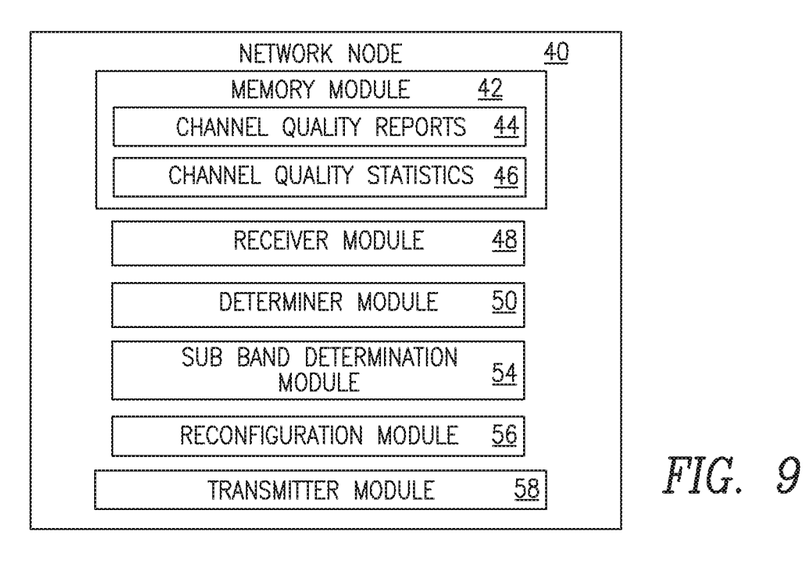
FIG. 9 is a block diagram of another network node according to some embodiments.

A block diagram of another network node 40 is shown in FIG. 9. The network node 40 includes a memory module 42 which is configured to store channel quality reports 44 and channel quality statistics 46. The network node 40 also includes modules that include a receiver module 48 configured to receive a plurality of channel quality reports from a wireless device, each report being indicative of a channel quality within at least a subband of an available bandwidth of the communication network, a determiner module 50 configured to determine variances and averages of channel quality over a predetermined measurement period, and a determiner module 54 configured to determine subbands having at least a channel quality variance less than a first threshold and possibly also a channel quality average greater than a second threshold. In some embodiments, the network node 40 may also comprise a reconfiguration module 56 configured to reconfigure radio resources for transmitting the downlink control channel in the determined subbands. A transmitter module 58 transmits the downlink control channel.

Figure 10:
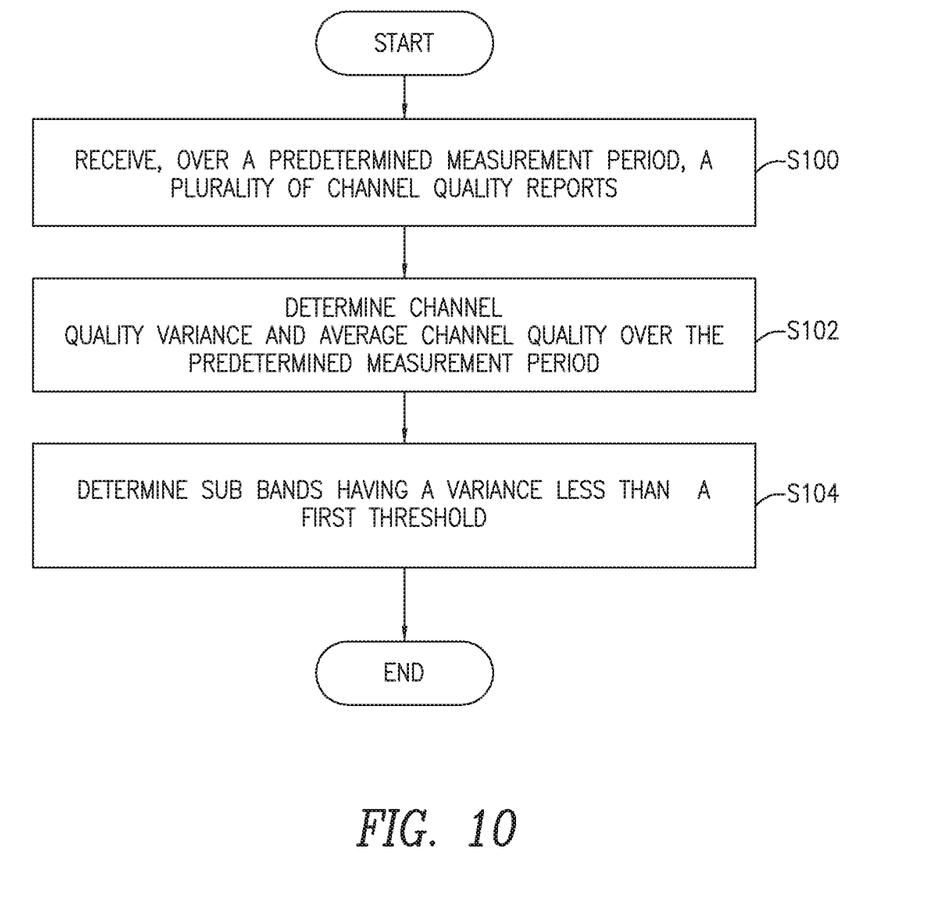
FIG. 10 is a flowchart of an exemplary process for allocating radio resources for a downlink control channel based on channel quality statistics.

FIG. 10 is a flowchart of an exemplary process of determining radio resources for allocation to a downlink control channel in a communication network. The process includes receiving, over a predetermined measurement period, a plurality of channel quality reports (block S100) from a wireless device. Each report is indicative of a channel quality within a subband of an available bandwidth of the communication network. In some embodiments, the reports are received by the network node 22.

For each subband, a variance and an average of the channel quality are determined over the predetermined measurement period (block S102). Note that in some embodiments, the predetermined measurement period may be a radio resource control reconfiguration sequence period and may be longer than a radio resource control reconfiguration sequence period. A radio resource control reconfiguration sequence period is the time it takes for the radio resource control reconfiguration request message to be sent and the radio resource control reconfiguration response to be received by the system. Such period may include latencies incurred in a loaded system.

Subbands that have at least a variance lower than a first threshold are then determined (block S104). From these subbands having at least a variance lower than the first threshold, one or more subbands are further determined. In some embodiments, the subbands having an average of the channel quality higher than a second threshold are further determined. In some other embodiments, a predetermined number of subbands having the highest average of the channel quality are further determined. The identities of these determined subbands may be transmitted to the wireless device.

In some embodiments, the process may further include reconfiguring an allocation of radio resources to the determined subbands if the determined subbands are different from current subbands used for transmitting the downlink control channels to the wireless device. In some embodiments, reallocation of the radio resources based on the determined subbands is performed if the reallocation would result in a more efficient allocation of radio resources. In some embodiments, a more efficient allocation of resources is indicated when a variance of the channel quality of currently used subbands is greater than a variance of the channel quality of the determined subbands. Similarly, a more efficient allocation of resources may be indicated when an average of the channel quality of the currently used subbands is less that the average of the channel quality of the determined subbands. In some embodiments, a more efficient allocation of resources is indicated only when both the variance of the channel quality of the currently used subbands is greater than a variance of the channel quality of the determined subbands and the average of the channel quality of the currently used subbands is less that the average of the channel quality of the determined subbands.

Figure 11:
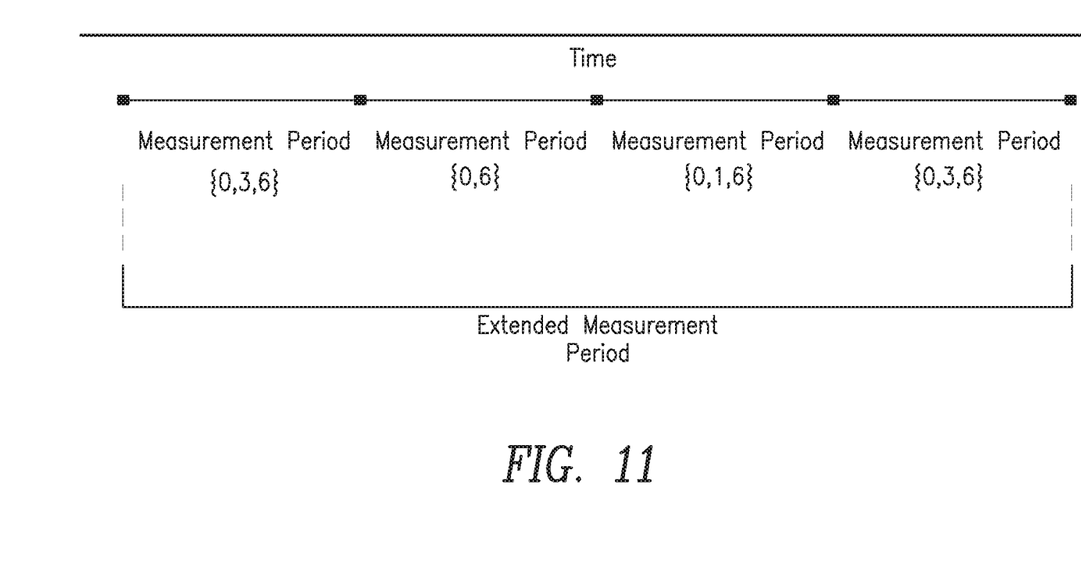
FIG. 11 is a timeline for receiving, aggregating and filtering candidate sub bands according to some embodiments.

In some embodiments, the subbands determined to meet the quality criteria (e.g. low channel quality variance, high channel quality average) after multiple consecutive measurement periods may be aggregated in order to further refine the selection of subbands. In other words, in such embodiments, instead of selecting subbands for resource allocation after one measurement period, subbands may be selected after several consecutive measurement periods. FIG. 11 shows an example timeline for receiving, aggregating and filtering candidate subbands according to some embodiments. Under the timeline, several consecutive measurement periods are shown with the subbands (identified by number) that have been considered viable for transmitting downlink control channels. In some embodiments, a predetermined number of these several consecutive measurement periods may amount to a longer measurement period, i.e. an extended measurement period. In some embodiments, subbands determined to meet the quality criteria in at least half of the consecutive measurement periods of the extended measurement period may be selected for transmission of the downlink control channels. According to such embodiments, subbands 0, 1, 3 and 6 would be selected in the example. In some embodiments, subbands determined to meet the quality criteria in a majority of the consecutive measurement periods of the extended measurement period may be selected for transmission of the downlink control channels. In such embodiments, subbands 0, 3 and 6 would be selected in the example. In other embodiments, subbands determined to meet the quality criteria in all of the consecutive measurement periods of the extended measurement period may be selected for transmission of the downlink control channels. In such embodiments, only subbands 0 and 6 would be selected in the example. In some embodiments, the extended measurement period may be a radio resource control reconfiguration sequence period. In some embodiments, the extended measurement period may be longer than the radio resource control reconfiguration sequence period.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and sub combination of these embodiments. Accordingly, all embodiments can be combined in any way and/or combination, and the present specification, including the drawings, shall be construed to constitute a complete written description of all combinations and sub combinations of the embodiments described herein, and of the manner and process of making and using them, and shall support claims to any such combination or sub combination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the invention, which is limited only by the following claims.

What is claimed is:

1. A method of determining radio resources for allocation to a downlink control channel in a communication network, the method comprising:
- receiving, over a predetermined measurement period, a plurality of reports from a wireless device, each report being indicative of a channel quality within a subband of a plurality of predefined contiguous subbands of an available bandwidth of the communication network;
- for each subband for which a plurality of reports have been received, determining a variance of the channel quality and an average of the channel quality over the predetermined measurement period;
- determining subbands having at least a variance of the channel quality less than a first threshold and having at least an average of the channel quality greater than a second threshold; and
- reconfiguring an allocation of radio resources to the determined subbands when a variance of the channel quality of currently used subbands is greater than the variance of the channel quality of the determined subbands and when an average of a channel quality of the currently used subbands is less that the average of the channel quality of the determined subbands.

2. The method of claim 1, wherein the channel quality within a subband is at least based on a measure of a deviation of a channel quality indicator of the subband from a wideband channel quality indicator.

3. The method of claim 1, wherein the predetermined measurement period is a radio resource control reconfiguration sequence period.

4. The method of claim 1, wherein the predetermined measurement period is longer than a radio resource control reconfiguration sequence period.

5. A node in a wireless communication network configured to determine radio resources for allocation to a downlink control channel in the wireless communication network, the node comprising:
- processing circuitry configured to:
  - receive, over a predetermined measurement period, a plurality of reports from a wireless device, each report being indicative of a channel quality within a subband of a plurality of predefined contiguous subbands of an available bandwidth of the communication network;
  - determine, for each subband for which a plurality of reports have been received, a variance of the channel quality and an average of the channel quality over the predetermined measurement period;
  - determine subbands having at least a variance of the channel quality less than a first threshold and having at least an average of the channel quality greater than a second threshold; and
  - reconfigure an allocation of radio resources to the determined subbands when a variance of a channel quality of currently used subbands is greater than the variance of the channel quality of the determined subbands and when an average of a channel quality of the currently used subbands is less that the average of the channel quality of the determined subbands.

6. The node of claim 5, wherein the channel quality within a subband is a measure of a deviation of a channel quality indicator of the subband from a wideband channel quality indicator.

7. The node of claim 5, wherein the predetermined measurement period is a radio resource control reconfiguration sequence period.

8. The node of claim 5, wherein the predetermined measurement period is longer than a radio resource control reconfiguration sequence period.

* * * * *